US009936626B2

(12) United States Patent
Chahley et al.

(10) Patent No.: US 9,936,626 B2
(45) Date of Patent: Apr. 10, 2018

(54) SYSTEM AND METHOD FOR INDEPENDENT CALIBRATION OF METER ROLLERS

(71) Applicant: CNH Industrial Canada, Ltd., Saskatoon (CA)

(72) Inventors: Dennis W. Chahley, Saskatoon (CA); Gordon Anthony Engel, Saskatoon (CA); Jack Donald Turner, Saskatoon (CA); Dennis George Thompson, Saskatoon (CA); Gregory Jacob Erker, Saskatoon (CA); Trevor Lawrence Kowalchuk, Saskatoon (CA); Anthony Charles Rapley, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 89 days.

(21) Appl. No.: 14/932,821

(22) Filed: Nov. 4, 2015

(65) Prior Publication Data
US 2016/0120107 A1 May 5, 2016

Related U.S. Application Data

(60) Provisional application No. 62/075,133, filed on Nov. 4, 2014.

(51) Int. Cl.
*A01C 7/10* (2006.01)
*A01C 7/12* (2006.01)
*G01F 25/00* (2006.01)

(52) U.S. Cl.
CPC .............. *A01C 7/107* (2013.01); *A01C 7/102* (2013.01); *A01C 7/12* (2013.01); *G01F 25/0007* (2013.01)

(58) Field of Classification Search
CPC .. A01C 7/102; A01C 7/10; A01C 7/08; A01C 7/00; A01C 7/12; A01C 7/107; A01C 7/105; G01F 25/0007; G01F 25/00
See application file for complete search history.

(56) References Cited

U.S. PATENT DOCUMENTS

| 5,873,533 A | 2/1999 | Sandbrook |
| 5,915,313 A | 6/1999 | Bender et al. |

(Continued)

FOREIGN PATENT DOCUMENTS

| CA | 2311698 A1 | 12/2001 |
| WO | 2011053286 | 5/2011 |

OTHER PUBLICATIONS

Memory, Russell, and Rick Atkins, "Air Seeding—The North American Situation," 1990. http://www1.agric.gov.ab.ca/$department/deptdocs.nsf/all/eng9937/$file/Air.pdf?OpenElement.

*Primary Examiner* — Christopher J. Novosad
(74) *Attorney, Agent, or Firm* — Rebecca L. Henkel; Rickard K. DeMille

(57) ABSTRACT

An agricultural product distribution system includes first and second product meters configured to meter first and second amounts of agricultural product from a product tank over first and second periods of time, respectively. The system also includes first and second motors coupled to the first and second product meters, respectively, and configured to turn the first and second product meters a first number of turns and a second number of turns, respectively, over the first and second periods of time to meter the first and second amounts of agricultural product. Further, the system includes a controller configured to receive inputs indicative of the first amount of agricultural product, the first number of turns, the second amount of agricultural product, and the second number of turns and to compare the signals to determine first (Continued)

and second calibration rate of the first and second product meters.

15 Claims, 6 Drawing Sheets

(56) References Cited

U.S. PATENT DOCUMENTS

| | | | |
|---|---|---|---|
| 6,024,035 | A | 2/2000 | Flamme |
| 6,296,425 | B1 | 10/2001 | Memory et al. |
| 6,626,120 | B2 | 9/2003 | Bogner et al. |
| 6,644,225 | B2 | 11/2003 | Keaton |
| 6,661,514 | B1 | 12/2003 | Tevs et al. |
| 6,851,377 | B2 | 2/2005 | Mayerle et al. |
| 6,935,256 | B1 * | 8/2005 | Meyer ............ A01C 7/081 111/174 |
| 7,395,769 | B2 | 7/2008 | Jensen |
| 7,617,785 | B2 | 11/2009 | Wendte |
| 7,726,251 | B1 | 6/2010 | Peterson et al. |
| 8,170,825 | B2 | 5/2012 | Beaujot et al. |
| 8,281,725 | B2 | 10/2012 | Wendte et al. |
| 8,307,771 | B2 | 11/2012 | Cannon et al. |
| 8,504,310 | B2 | 8/2013 | Landphair et al. |
| 8,522,770 | B2 | 9/2013 | Colburn et al. |
| 8,601,963 | B2 | 12/2013 | Friggstad |
| 8,671,857 | B2 | 3/2014 | Kowalchuk et al. |
| 8,695,396 | B2 | 4/2014 | Landphair et al. |
| 8,701,576 | B2 | 4/2014 | Friggstad |
| 8,714,097 | B2 | 5/2014 | Friggstad |
| 2001/0000611 | A1 * | 5/2001 | Cline ............ B05B 12/1418 222/1 |
| 2011/0054743 | A1 | 3/2011 | Kocer et al. |
| 2012/0211508 | A1 | 8/2012 | Barsi et al. |
| 2012/0227647 | A1 | 9/2012 | Gelinske et al. |
| 2012/0266795 | A1 | 10/2012 | Silbernagel et al. |
| 2012/0325130 | A1 | 12/2012 | Kowalchuk |
| 2013/0061790 | A1 | 3/2013 | Binsirawanich et al. |
| 2013/0192503 | A1 | 8/2013 | Henry et al. |
| 2014/0076217 | A1 | 3/2014 | Liu et al. |
| 2014/0076218 | A1 | 3/2014 | Liu et al. |
| 2015/0216109 | A1 | 8/2015 | Meyer et al. |

* cited by examiner

SYSTEM AND METHOD FOR INDEPENDENT CALIBRATION OF METER ROLLERS

CROSS-REFERENCE TO RELATED APPLICATION

This application claims priority from and the benefit of U.S. Provisional Application Ser. No. 62/075,133, entitled "SYSTEM AND METHOD FOR INDEPENDENT CALIBRATION OF METER ROLLERS", filed Nov. 4, 2014, which is hereby incorporated by reference in its entirety for all intents and purposes.

BACKGROUND

The present disclosure relates generally to product distribution systems for agricultural implements and, more particularly, to calibration of meter rollers of the product distribution system.

Generally, agricultural implements (e.g., seeders) are configured to distribute product (e.g., seeds and fertilizer) across a field. The agricultural implement may improve crop yield and/or farming efficiency by providing an even distribution of the product across the field and/or increasing speed at which the product is distributed across the field.

However, traditional product distribution systems for agricultural implements often distribute agricultural product, at any given time, to multiple rows (e.g., via multiple row units) using meters that are coupled to a single drive shaft that drives the meters at a single rate. Unfortunately, improperly or crudely calibrated meters may reduce farming efficiency and accuracy.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, an agricultural product distribution system includes a first product meter configured to meter a first amount of agricultural product from a product tank over a first period of time and a second product meter configured to meter a second amount of agricultural product from the product tank over a second period of time. The system also includes a first motor coupled to the first product meter and configured to turn the first product meter a first number of turns over the first period of time to meter the first amount of agricultural product, and a second motor coupled to the second product meter and configured to turn the second product meter a second number of turns over the second period of time to meter the second amount of agricultural product. Further, the system includes a controller configured to receive a first input indicative of the first amount of agricultural product and a second input indicative of the first number of turns and to compare the first and second inputs to determine a first calibration rate of the first product meter, and to receive a third input indicative of the second amount of agricultural product and a fourth input indicative of the second number of turns and to compare the third and fourth inputs to determine a second calibration rate of the second product meter.

In a second embodiment, a control system configured to control an agricultural product distribution system includes a controller configured to receive a first signal indicative of a first amount of product dispensed by a first product meter from a product tank, a second signal indicative of a first number of turns of the first product meter that produces the first amount of product, a third signal indicative of a second amount of product dispensed by a second product meter from the product tank, and a fourth signal indicative of a second number of turns of the second product meter that produces the second amount of product. The controller is configured to compare the first and second signals to determine a first calibration rate of the first product meter, to compare the third and fourth signals to determine a second calibration rate of the second product meter, or both. Further, the controller is configured to adjust a first turn rate of the first product meter based on the first calibration rate, the second calibration rate, or both, and to adjust a second turn rate of the second product meter based on the first calibration rate, the second calibration rate, or both.

In a third embodiment, a method of operating a product distribution calibration system for an agricultural implement includes collecting a first amount of agricultural product dispensed by a first product meter from a product tank and a second amount of agricultural product dispensed by a second product meter from the product tank. The method also includes counting a first number of turns of the first product meter that produces the first amount of agricultural product and a second number of turns of the second product meter that produces the second amount of agricultural product. Further, the method includes determining, via a processor, a first calibration rate for the first product meter based on the first amount of agricultural product and the first number of turns. Further still, the method includes determining, via the processor, a second calibration rate for the second product meter based on the second amount of agricultural product and the second number of turns.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
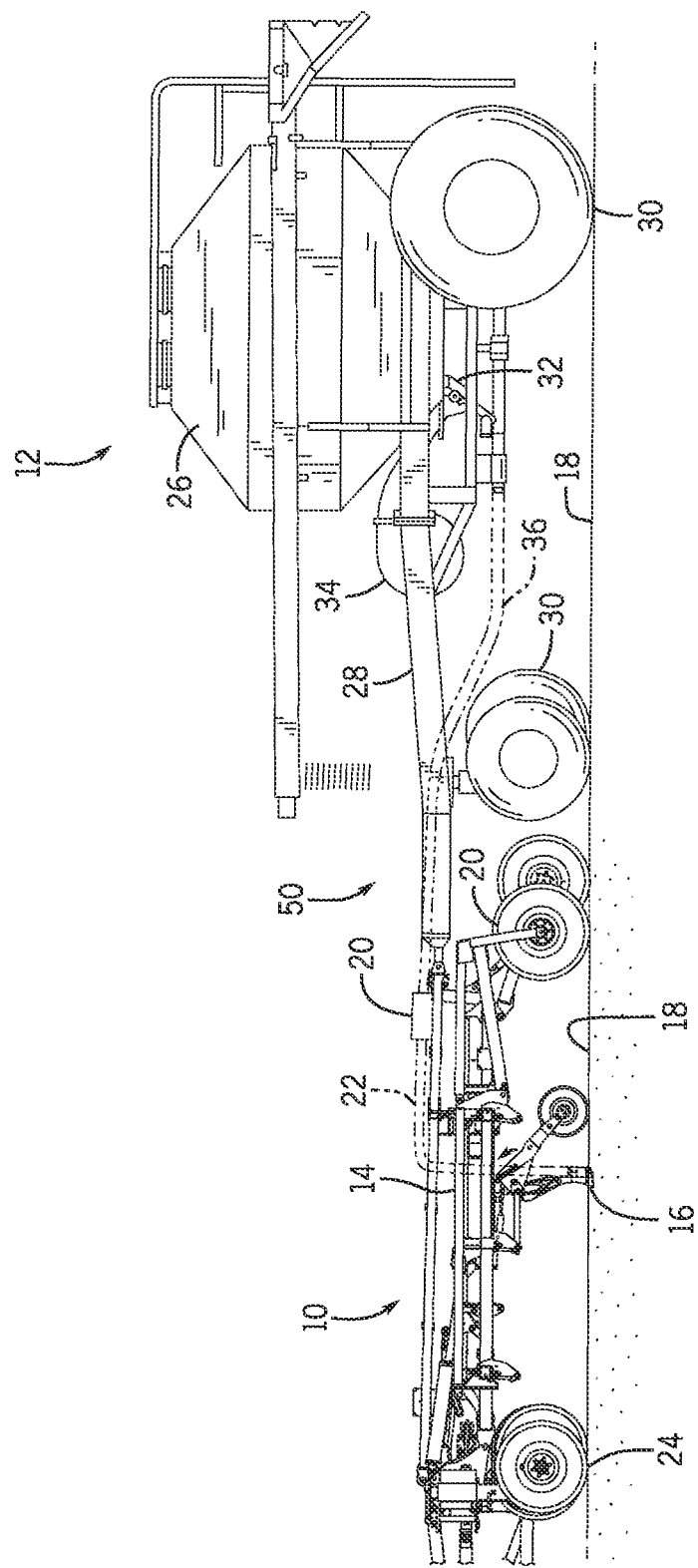
FIG. 1 is a side view of an embodiment of an agricultural implement having a product distribution system with independently controllable meter rollers.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate generally to product distribution systems for agricultural implements and, more specifically, to calibration of meter rollers of the product distribution system. For example, the product distribution system includes a metering system with independently controllable meter rollers, each meter roller being configured to distribute product to a corresponding primary distribution line coupled to the meter roller. Each meter roller is also coupled to a respective motor configured to drive (e.g., turn) the meter roller, and each motor is electrically, hydraulically, or otherwise coupled to a controller of the product distribution system. Accordingly, the controller may independently control a turning rate of each motor, thereby independently controlling (e.g., driving) the turning rate of each meter roller.

To calibrate the meter rollers, the controller may enter a calibration mode. For example, the controller may select one or more of the meter rollers to calibrate. Depending on various factors, it may be desirable to calibrate only one of the meter rollers in isolation, or a subset of all the meter rollers together, or all of the meter rollers simultaneously. After determining which meter roller(s) to calibrate, the controller instructs the meter system (and, by extension, the motors thereof) to drive the meter rollers into rotation for a period of time, thereby dispensing product (e.g., via a gravity feed) from a product storage tank above the meter rollers through each meter roller, where the product storage tank is fluidly coupled to each meter roller. It should be noted that, during the calibration process, the primary lines may be disengaged from the meter rollers to enable product to be collected via collection containers as the product is dispensed from the meter rollers. Alternatively, a collection area may be disposed downstream of the primary lines, thereby enabling collection of the product in the collection containers downstream of the primary lines.

As the product is dispensed from the meter rollers selected for calibration, the product is collected in product collection containers. For example, a separate container may be fluidly coupled to each meter roller, such that product is separately collected for each meter roller being calibrated. The containers may be coupled to respective load cells, which weigh the product and communicate a calibration number (e.g., the weight) to the controller. The controller also includes counters configured to count a number of turns (e.g., revolutions) for each meter roller. The controller then compares the number of turns and the amount (e.g., weight) of product collected for each respective meter roller over the period of time and determines a calibration rate (e.g., weight per turn or product mass flow per turn) for each meter roller. Additionally, based on the calibration rate for each meter roller, the controller may selectively adjust the turn rate of various ones of the motors to adjust a metering rate of the respective meter rollers to cause each of the meter rollers to dispense product at a desired or a target metering rate.

With the foregoing in mind, a side view of an air cart having a product distribution system is shown in FIG. 1. In the illustrated embodiment, an implement 10 is coupled to an air cart 12 such that the air cart 12 is towed behind (or in front of) the implement 10 during operation and transport. The implement 10 includes a tool frame 14 with a ground engaging tool 16 (e.g., opener, row unit, outlet). The ground engaging tool 16 is configured to excavate a trench into the soil 18 for seed and/or fertilizer deposition. In the illustrated embodiment, the ground engaging tool 16 receives product (e.g., seed and/or fertilizer) from a product distribution header 20 via a hose 22 (e.g., secondary line) extending between the header 20 and the ground engaging tool 16. Although only one ground engaging tool 16, product distribution header 20, and hose 22 are shown in the illustrated embodiment to facilitate discussion, it should be appreciated that the implement 10 includes additional tools 16, headers 20 and/or hoses 22 (e.g., secondary lines) to facilitate product delivery to the soil 18 in a number of rows across the field. Further, as illustrated, the implement 10 includes one or more wheel assemblies 24 which contact the soil surface 18 and enable the implement 10 to be pulled by a tow vehicle.

As discussed above, the air cart 12 is coupled to the implement 10, and towed behind (or in front of) the implement 10. As will be appreciated, in certain embodiments, the air cart 12 may be towed directly behind a tow vehicle, with the implement 10 towed behind the air cart 12. Likewise, the implement 10 and the air cart 12 may be part of a single unit, or the implement 10 and the air cart 12 may be separate units that are coupled together.

The air cart 12 includes a storage tank 26, a frame 28, wheels 30, a metering system 32, and an air source 34. The frame 28 includes a towing hitch configured to couple to the implement 10 or tow vehicle. In certain configurations, the storage tank 26 includes multiple compartments for storing various flowable particulate materials. For example, one compartment may include seeds, and another compartment may include a dry fertilizer. Alternatively, the air cart 12 may include multiple tanks, each tank configured to store a different agricultural product. In either configuration, the air cart 12 may be configured to deliver both the seeds and the fertilizer to the implement 10. In general, seeds and/or fertilizer within the storage tank 26 are gravity fed into the metering system 32.

In the present embodiment, the metering system 32 includes sectioned, independently controllable meter rollers to regulate the flow of material from the storage tank 26 into an air flow provided by the air source 34. The air flow then carries the material through hoses 36 (e.g., primary lines or primary distribution lines) to the implement 10, thereby supplying the ground engagement tools 16 with seeds and/or fertilizer for deposition within the soil. Although only one primary line 36 is shown in the illustrated embodiment to facilitate discussion, embodiments of the present disclosure generally include multiple primary lines 36, where each primary line 36 is coupled to a respective header 20. For example, each meter roller of the metering system 32 may be coupled to its own primary line 36, and each primary line 36 may be coupled to its own header 20. Further, each header 20 may be coupled to its own set of secondary lines or hoses 22, which each extends to its own ground engaging tool 16 (e.g., opener or outlet). It should be noted that the storage tank 26, the metering system 32, the primary lines 36, the headers 20, the secondary lines 22, and the ground engaging tools 16 may all be components of what will be referred to herein as a product distribution system 50 of the combined air cart 12 and implement 10.

In accordance with present embodiments, a control system assembly may be communicatively coupled to the illustrated metering system 32 (and, in some embodiments, to the air source 34) to regulate metering of product from the storage tank 26 to the implement 10. The control assembly may independently control each meter roller of the metering system 32. For example, the control assembly may independently control motors coupled to each meter roller, thereby independently controlling a turn rate of the motors and, thus, the meter rollers. In other words, each meter roller may rotate at an independently controllable turn rate. In accordance with present embodiments, the control assembly may include a calibration mode to independently calibrate each meter roller, which enables the control assembly to operate as a calibration system for the meter rollers. The control assembly, calibration procedure and system, and related features will be described below with reference to later figures.

Figure 2:
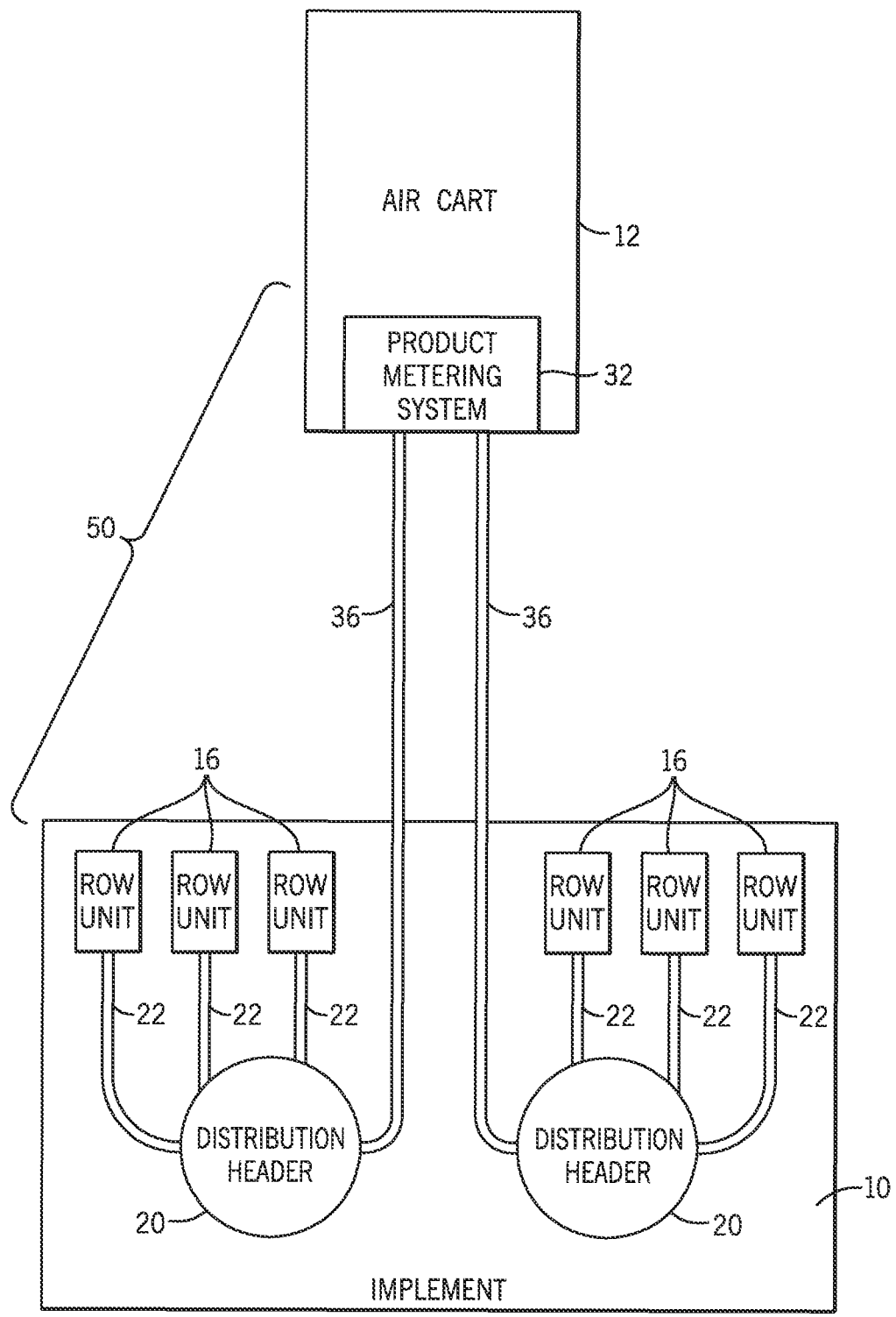
FIG. 2 is a schematic view of a portion of an embodiment of the agricultural implement of FIG. 1 having the product distribution system.

To facilitate a better understanding of the agricultural implement 10 and air cart 12 described above with reference to FIG. 1, a schematic diagram of an embodiment of the air cart 12 coupled to the implement 10 is shown in FIG. 2. In the illustrated embodiment, the distribution system 50 includes at least the metering system 32, the primary distribution lines 36, the distribution headers 20, the secondary distribution lines 22, and the ground engaging tools 16 (e.g., row units, openers, outlets). Product is delivered from the air cart 12 to the ground engaging tools 16 using the distribution system 50. For example, product may initially be located in the air cart 12 (e.g., within a storage tank). The distribution system 50 transfers the product using the metering system 32 to primary distribution lines 36. The primary distribution lines 36 transfer the product to distribution headers 20 positioned on the implement 10. Further, the distribution headers 20 transfer the product through secondary distribution hoses or lines 22 to deliver the product to the ground engaging tools 16 (e.g., outlets, openers, row units) of the implement 10.

It should be noted that, in some embodiments, an air source may provide an air flow to urge the product through the primary lines 36, the headers 20, and the secondary lines 22. The air source may blow the air through the distribution system 50 starting at or around a position of the coupling between the primary lines 36 and the metering system 32. It should also be noted that the number of primary lines 36, the number of distribution headers 20, the number of secondary lines 22, and the number of ground engaging tools 16 (e.g., row units) may vary depending on the embodiment. For example, the product distribution system 50 may include 2, 3, 4, 5, 6, 7, 8, 9, 10, or more primary distribution lines 36 and corresponding headers 20. Further, each header 20 may include 2, 3, 4, 5, 6, 7, 8, 9, 10, or more secondary distribution lines 22 and corresponding ground engaging tools 16 (e.g., outlets, openers, row units).

Figure 3:
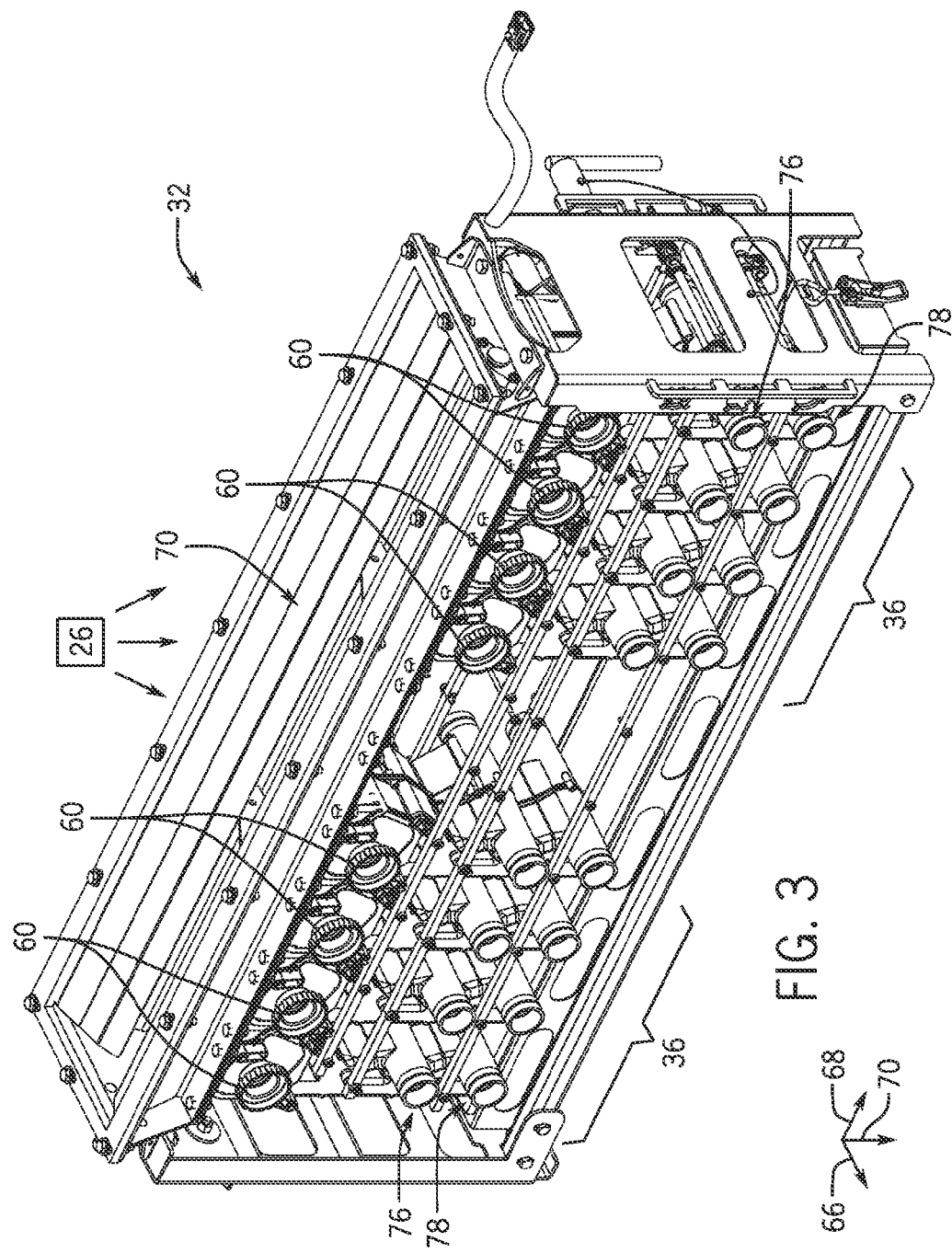
FIG. 3 is a perspective view of an embodiment of a metering system having independently controllable meter rollers for use in the product distribution system of FIG. 1.

It should also be noted that, in accordance with present embodiments, the illustrated metering system 32 includes a separate, independently controllable meter (e.g., meter roller) for each primary line 36 (or for a subset of the primary lines 36), where each separate meter roller meters (e.g., dispenses) agricultural product from a product storage tank of the air cart 12 to its respective primary distribution line 36. For example, a perspective view of an embodiment of the metering system 32, in accordance with the present disclosure, is shown in FIG. 3. In the illustrated embodiment, the metering system 32 includes eight individual meter rollers 60 (e.g., meter modules). Each meter roller 60 is coupled to a respective motor 62, which is configured to drive the meter roller 60 into rotation. In the illustrated embodiment, the motors 62 are disposed behind the meter rollers 60 and, thus, are not all viewable. However, for clarity, an embodiment of one motor 62 and one corresponding meter roller 60 is shown in an exploded perspective view in FIG. 4. As shown, the motor 62 may be directly coupled to the meter roller 60, or the motor 62 may be coupled to a drive shaft that is also coupled to the respective meter roller 60.

Continuing with reference to the embodiment in FIG. 3, the motors 62 are configured to drive the meter rollers 60 into rotation about a rotational axis 66 or direction. For example, the meter rollers 60 may be disposed adjacent to one another in a line extending in a direction 68, which may generally be in the direction of travel of the air cart 12. However, in another embodiment, the meter rollers 60 may be positioned such that they are disposed at a right angle to the direction of travel of the air cart 12. As shown, the meter rollers 60 are positioned such that they rotate about a rotational axis 66 (e.g., direction), which is perpendicular to the direction 68. However, in another embodiment, the meter rollers 60 are positioned such that they rotate about an axis that is parallel to direction 68. As the meter rollers 60 rotate, product from the storage tank 26 above the metering system 32 is gravity fed into a hopper 70 above the meter rollers 60 and down into each meter roller 60. The meter rollers 60 may be fluted or knobbed (or otherwise configured to include protrusions for metering product) such that adjacent ridges 72 of the fluted roller 60 define a compartment 74 into which the product is fed. As the meter rollers 60 turn, the product is supported within the compartment 74 until the compartment 74 gravity feeds the product downward (e.g., in direction 70) toward the primary distribution lines 36.

It should be noted that, in the illustrated embodiment, the primary distribution lines 36 are disposed in a top row 76 and a bottom row 78. For example, each meter roller 60 includes a top row 76 primary line 36 and a bottom row 78 primary line 36 directly below the meter roller 60. However, each meter roller 60 may only access one of the two primary lines 36 disposed below the meter roller 60. Further still, in some embodiments, the product may be metered by blending the metered product (e.g., from the meter roller 60) between the top and the bottom rows 76, 78. The metering system 32 includes the top and bottom rows 76, 78 to enable isolated distribution of a first product (e.g., seed) and a second product (e.g., fertilizer). For example, the seed may be distributed via the illustrated metering system 32 through the meter rollers 60 to the top row 76 of primary lines 36. Another metering system 32 may be configured to distribute fertilizer through its meter rollers 60 to the bottom row 78 of primary lines 36, which extend between the two metering systems 32.

Figure 5:
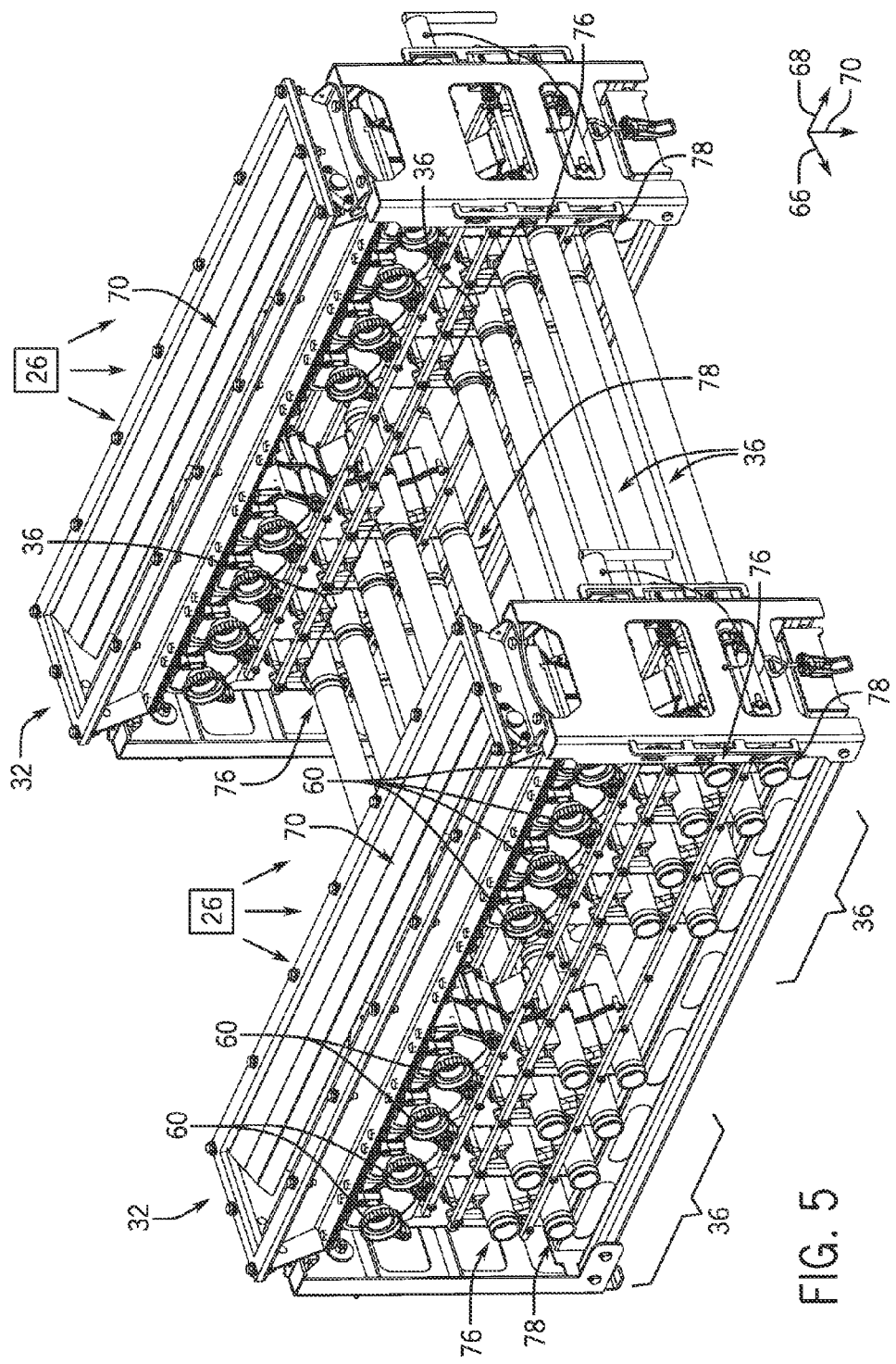
FIG. 5 is a perspective view of an embodiment of two of the metering systems of FIG. 3 in series.

For example, a perspective view of an embodiment having two metering systems 32 to meter seed to the top row 76 of primary lines 36 and fertilizer to the bottom row 78 of primary lines 36 is shown in FIG. 5. One of the metering systems 32 may be disposed downstream (relative to a direction of a flow of the product) from the other of the metering systems 32. Accordingly, the metering system 32 disposed downstream of the other metering system 32 may be referred to herein as the "downstream metering system 32," and the metering system 32 disposed upstream of the downstream metering system 32 may be referred to herein as the upstream metering system 32. In the illustrated embodiment, the two metering systems 32 distribute product in direction 66. For example, the upstream metering system 32 includes meter rollers 60 in fluid communication with the bottom row 78 of primary lines 36 and isolated from the top row 76 of primary lines 36. The meter rollers 60 are, as previously described, in fluid communication with the hopper 70 directly above the meter rollers 60 and directly below the storage tank 26, where the storage tank stores fertilizer. As the meter rollers 60 are driven into rotation via the motors 62, fertilizer is metered to the bottom row 78 of primary lines 36.

The downstream metering system 32 includes meter rollers 60 in fluid communication with the top row 76 of primary lines 36 and isolated from the bottom row 78 of primary lines 36. The meter rollers 60 are in fluid communication with the hopper 70 directly above the meter rollers 60 and directly below the storage tank 26, where the storage tank stores seed. As the meter rollers 60 are driven into rotation via the motors 62, seed is metered to the top row 76 of primary lines 36. The top rows 76 of the primary lines 36 of the upstream and downstream metering systems 32 are coupled together, and the bottom rows 78 of primary lines 36 of the upstream and downstream metering systems 32 are coupled together. Accordingly, both the seed and fertilizer are distributed to the row units. Depending on the embodiment, the top and bottom rows 76, 78 of primary lines 36 may have separate headers, or they may have a common header 20 and common secondary lines 22.

It should be noted that the top and bottom rows 76, 78 and the upstream and downstream metering systems 32 could be used for either seed or fertilizer, or any other agricultural product metered to an agricultural implement. The illustrated configuration and the description above should not limit the scope of the present disclosure, as one of ordinary skill in the art would recognize that the systems could be used interchangeably with a number of different agricultural products.

Figure 4:
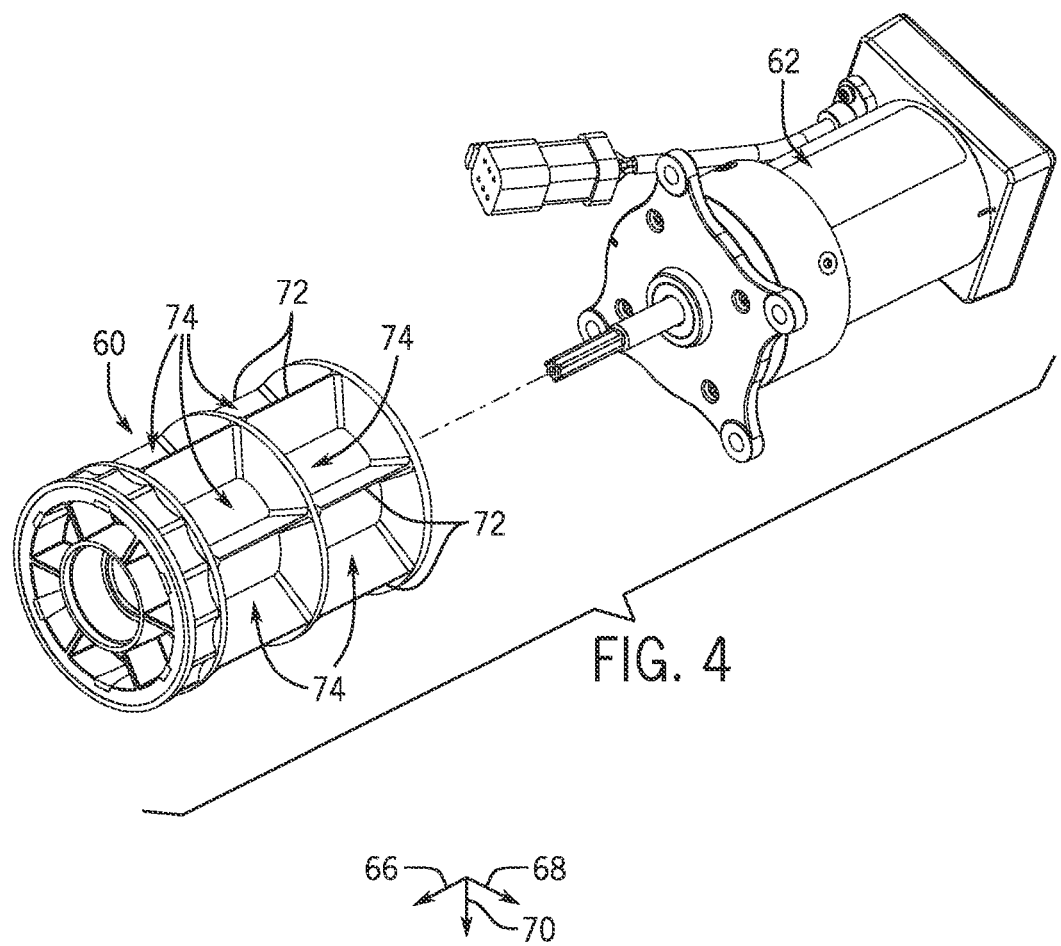
FIG. 4 is an exploded perspective view of an embodiment of a meter roller and a corresponding motor for use in the metering system of FIG. 3.

Further, it should be noted that the individual meter rollers 60 and their respective motors 62 shown in FIGS. 3-5 are independently controllable, as previously described. For example, a control assembly or control system, in accordance with present embodiments, may independently control a metering rate of each meter roller 60 by independently controlling a turn rate of each respective motor 62. Additionally, the control system may independently calibrate each meter roller 60. The control assembly or system will be described in detail below with reference to later figures.

Figure 6:
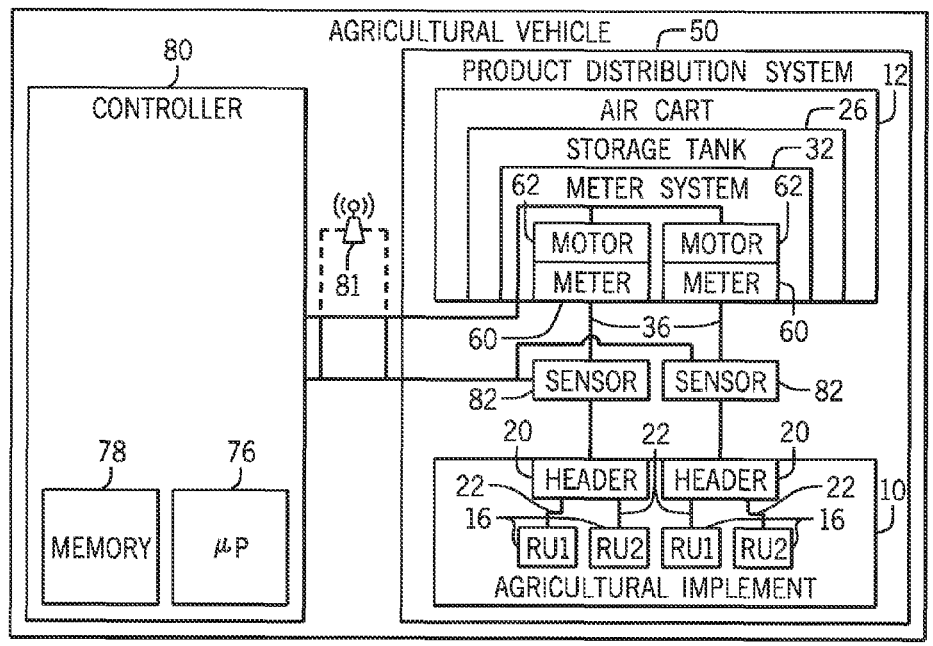
FIG. 6 is a schematic view of a portion of an embodiment of the agricultural implement of FIG. 1 having the product distribution system with independently controllable meter rollers.

A schematic diagram of an embodiment of a control system configured to control various aspects of the metering system 32, in accordance with the present disclosure, is shown in FIG. 6. In the illustrated embodiment, a controller 80 of the control system is communicatively coupled to the metering system 32. The controller 80 includes a processor, such as a microprocessor 76, and a memory device 78. The controller 80 may also include one or more storage devices and/or other suitable components. The processor 76 may be used to execute software, such as software for controlling the metering system 32, an air flow system coupled to the metering system 32, and so forth. Moreover, the processor 76 may include multiple microprocessors, one or more "general-purpose" microprocessors, one or more special-purpose microprocessors, and/or one or more application specific integrated circuits (ASICS), or some combination thereof. For example, the processor 76 may include one or more reduced instruction set (RISC) processors and/or one or more complex instruction set (CISC). It should be noted that the controller 80 may instruct the metering system 32 to perform various functions. Accordingly, any reference herein to the controller's 80 instruction of various components or sub-components of, or in connection with, the metering system 32 may refer to control of the metering system 32 itself.

The memory device 78 may include a volatile memory, such as random access memory (RAM), and/or a nonvolatile memory, such as ROM. The memory device 78 may store a variety of information and may be used for various purposes. For example, the memory device 78 may store processor-executable instructions (e.g., firmware or software) for the processor 76 to execute, such as instructions for controlling, e.g., the metering system 32. The storage device(s) (e.g., nonvolatile storage) may include read-only memory (ROM), flash memory, a hard drive, or any other suitable optical, magnetic, or solid-state storage medium, or a combination thereof. The storage device(s) may store data or inputs (as described below), instructions (e.g., software or firmware for controlling the metering system 32, or the like), and any other suitable data.

As described above, the controller 80 is communicatively coupled to the metering system 32. For example, the controller 80 may be electrically coupled to the metering system 32, or the controller 80 may be coupled to the metering system 32 via a wireless system 81 (e.g., Internet system, Wi-Fi system, Bluetooth system). In particular, the controller 80 is communicatively coupled to the motors 62 of the metering system 32, such that the controller 80 may control independent drive rates (e.g., turn rates) of the motors 62 that are imparted to the meter rollers 60. Because the controller 80 is coupled to both of the motors 62 in the illustrated embodiment, and each motor 62 drives one meter roller 60 independent of the other meter roller 60, the controller 80 can independently control a turn rate of each meter roller 60. In other words, if desired, the controller 80 can instruct a different metering rate for each meter roller 60 by instructing, e.g., a different turn rate for each motor 62. It should be noted that the turn rate of the motor 62 may refer to a turn rate of an output shaft of the motor 62, as the motor 62 may include an integral or internal gearbox that imparts a different turn rate to the output shaft than that of the motor 62 itself. In general, the turn rate of the motor 62 referred to herein is considered substantially the same as the turn rate of the meter roller 60. However, in some embodiments, a gear system, chain belt, or belt drive system may also couple the motor 62 to the meter roller 60, thereby imparting a different turn rate to the meter roller 60 than that of the motor 62.

In the illustrated embodiment, the control system (e.g., having the controller 80) is configured to control turn rates of the motors 62 (and, thus, metering rates of the meter rollers 60), and also is configured to calibrate each of the meter rollers 60. For example, sensor assemblies 82 are communicatively coupled to the controller 80 via electrical wiring or via the wireless system 81. The controller 80 may selectively engage one or more of the sensor assemblies 82, depending on the meter rollers 60 selected to be calibrated, to the product distribution system 50. When engaged, the sensor assemblies 82 are configured to collect product dispensed from the metering system 32 and to detect an amount (e.g., weight) of the collected product from each meter roller 60. For example, the sensor assemblies 82 may be selectively engaged upstream of the primary distribution lines 36, downstream of the primary distribution lines 36, or in a midsection of the primary distribution lines 36 when the controller 80 instructs (e.g., activates) a calibration mode for calibrating the metering system 32. The calibration mode may be activated via an operator input to the controller 80, or may be activated via a time-based schedule that periodically enables the calibration mode. The time-based schedule may be a default setting of the controller 80, or the time-based schedule may be input by an operator of the controller 80.

Once the sensor assemblies 82 are engaged, the sensor assemblies 82 are fluidly coupled to the metering system 32. For example, a different sensor assembly 82 may be fluidly coupled to each meter roller 60 of the metering system 32. Each sensor assembly 82 may include a corresponding collection container (e.g., bag, box, container) that collects the agricultural product from the respective meter roller 60 fluidly coupled to the sensor assembly 82. However, it should be noted that, in another embodiment, the sensor assembly 82 may be a mass flow sensor that does not include a container to collect the product, but rather senses the amount of product as it passes by in the airstream. In operation in accordance with the presently illustrated embodiment, the controller 80 may activate the calibration mode (e.g., calibration process) to enable the motors 62 to drive the meters 60 into rotation, thereby dispensing the product, for a period of time. After the period of time has lapsed, the controller 80 instructs the motors 62 to discontinue driving the meter rollers 60. As described above, the sensor assemblies 82 collect the metered product over the period of time in the collection containers. Each sensor assembly 82 also includes a sensor configured to detect an amount (e.g., a weight) of the product that is collected in the collection container. For example, the sensor may be include a load cell (e.g., a scale) that outputs a signal indicative of a weight of the product. In some embodiments, the sensor may be a movable light sensor (e.g., optical sensor) that moves up and down the collection container, detects a height of the product stacked within the collection container, and outputs a signal from which the weight of the product can be derived or estimated. Alternatively, the sensor may be an ultrasonic sensor that measures a height of the product stacked (e.g., collected) within the collection container, and outputs a signal from which the weight of the product can be derived or estimated.

The sensors of the respective sensor assemblies 82 output signals indicative of the measurements (e.g., the weights) of the product collected in each collection container to the controller 80. The controller 80 also tracks (e.g., counts) a number of turns of the motor 60 over the period of time the calibration mode is activated. It should be noted that, as previously described, the number of turns of the motor 60 may refer to a number of turns of the output shaft of the motor 60, which is coupled to the meter roller 62. In other words, the number of turns of the motor 60 referred to herein may substantially correspond with the number of turns of the meter roller 62. Indeed, in some embodiments, the number of turns of the meter roller 62 may be counted by the controller 80. It should also be noted that a sensor (e.g., an optical sensor or a switch) may track (e.g., count) the number of turns of the motor 60 or shaft thereof (or of the meter roller 62) and communicate, via a signal, the number of turns to the controller 80. Alternatively, the controller 80 may automatically know the number of turns of the motor 60 based on the period of time the motor 60 turns and the rate at which the controller 80 instructs the motor 60 to turn. Further, in some embodiments, instead of instructing the motor 60 to turn for the period of time, the controller 80 may instruct the motor 60 to turn a specific number of turns. Generally, after the motor 60 has been instructed to stop turning, the controller 80 has determined the number of times the motor 60 has turned.

Accordingly, the controller 80 receives first inputs of the weights from each sensor assembly 82, and second inputs of the number of turns of each motor 62 (and, thus, each meter roller 60 coupled to each motor 62). The controller 80 then compares the weight of product collected from each meter roller 60 with the number of turns of each meter roller 60 to deduce a calibration rate (e.g., weight per turn or product mass flow per turn) for each meter roller 60 over the period of time. Thus, the calibration rate for each meter roller 60 is calculated separately. Based on the calibration rate for each meter roller 60, the controller 80 may be independently adjust a turn rate for each motor 62 to facilitate delivery of the agricultural product to the field at target application rates (e.g., weight per hectare). Further, it should be noted that, when the calibration process is activated, the controller 80 may instruct activation of the calibration process for all the meter rollers 60, for only one of the meter rollers 60, or for a subset of all the meter rollers 60. Thus, the sensor assemblies 82 of all the meter rollers 60, or for only one of the meter rollers 60, or for a subset of all the meter rollers 60 may be engaged via instruction by the controller 80.

As previously described, the controller 80 may automatically instruct engagement of the sensor assemblies 82 (e.g., via a time-based schedule), or an operator may manually enter the instructions into the controller 80. It should also be noted that, in some embodiments, the sensor assemblies 82 (or collection containers thereof) may be manually engaged, via an operator, with the metering assembly 32. For example, the collection containers may be positioned (e.g., via any suitable fastener, such as a hook), by an operator, below the meter rollers 60 to collect the product dispensed from the meter rollers 60. Then, the operator may move the collection containers onto or adjacent the sensors to measure (e.g., weigh) the product in each collection container independently. The operator may then enter the weights into the controller 80, or the sensors may automatically communicate the weights to the controller 80.

In general, independent control and/or calibration of each meter roller 60, as described above, enables the controller 80 to instruct turning rates that cause desired or target metering rates to be provided for each meter roller 60 and that cause delivery of the agricultural product to the field at target application rates by each meter roller 60. For example, in some embodiments, one or more of the meter rollers 60 may include a feature that causes the one or more meter rollers 60 to meter the product at a slower rate than the other meter rollers 60, even if all the meter rollers 60 are driven into rotation at the same turning rate. Accordingly, the presently disclosed control assembly and calibration process enables variable rate control of each meter roller 60 to ensure that each of the meter rollers 60 distribute the same amount of product to each ground engaging tool 16 (e.g., row unit). Alternatively, if variable metering of the product is desired to each of the ground engaging tools 16 (e.g., row units), the presently disclosed control assembly and calibration process enables variable rate control of each meter roller 60 to ensure that the desired metering rate for each meter roller 60 is provided.

Further, independent calibration of meter rollers 60 in accordance with the above description enables a number of different calibration processes. For example, each of the meter rollers 60 may be calibrated separately (e.g., product weighed separately and number of turns counted separately), and each of the turning rates of the meter rollers 60 may be adjusted separately based on the calibration rates determined by the controller 80. In some embodiments, all the meter rollers 60 may be calibrated separately, and the calibration rates for all the meter rollers 60 may be averaged such that the average calibration rate is utilized, by the controller 80, to adjust the turning rates of all the motors 62 and corresponding meter rollers 60. In some embodiments, all of the product may be weighed together and all of the number of turns of the meter rollers 60 may be added, such that a single calibration rate can be determined, by the controller 80, and used to adjust the turning rates of the motors 62 and corresponding meter rollers 60. Alternatively, only one (or a subset) of the meter rollers 60 may be calibrated, and the calibration rate determined for the one meter roller 60 (or for each meter roller 60 of the subset) by the controller 80 may be utilized to adjust turn rates of the one meter roller 60 (or for each meter roller 60 of the subset), or all the meter rollers 60.

Figure 7:
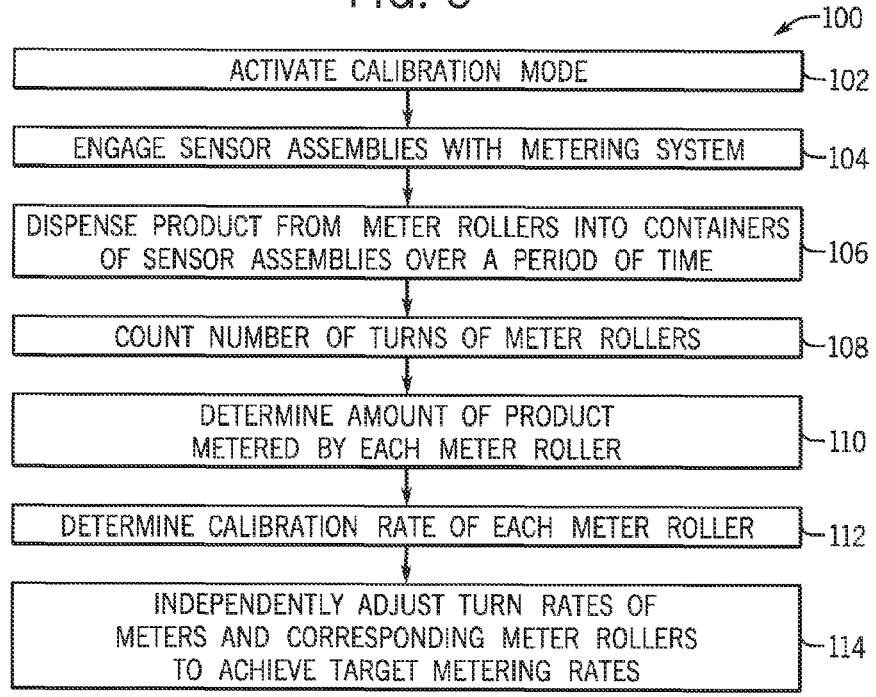
FIG. 7 is a process flow diagram of an embodiment of a method of operating a calibration system for calibrating the metering system of FIG. 3.

Turning now to FIG. 7, a process flow diagram illustrating an exemplary method 100 of operating the control system (e.g., having the controller 80) to conduct the calibration mode (e.g., calibration process) is shown. In the illustrated embodiment, the method 100 includes activating the calibration mode (block 102). As previously described, the calibration mode may be activated via a time-based schedule programmed into the controller 80, or the calibration mode may be activated via entry of instructions into the controller 80 by an operator.

Once the calibration mode is activated, sensor assemblies 82 having collection containers are engaged (e.g., fluidly coupled) with the meter rollers 60 of the metering system 32 (block 104). Depending on the instructions from the controller 80, or depending on the actions of an operator, sensor assemblies 82 may be engaged with all the meter rollers 60, sensor assemblies 82 may be engaged with a subset of all the meter rollers 60, or only one sensor assembly 82 may be engaged with only one of the meter rollers 60, depending on which meter rollers 60 are selected to be calibrated.

Once the appropriate sensor assemblies 82 are engaged with the appropriate meter rollers 60, the controller 80 instructs the meter system 32 to cause the meter rollers 60 to dispense product over a period of time (block 106). The method 100 also includes counting, via the controller 80, a number of turns for each meter roller 60 over the period of time (block 108). It should be noted that the number of turns for one meter roller 60 may not be the same as the number of turns of another meter roller 60, given that the two meter rollers 60 may be turning at a different rate over the period of time. Accordingly, the controller 80 independently counts the number of turns for each meter roller 60 being calibrated.

Further, the sensor assemblies 82 described above determine an amount (e.g., weight) of product dispensed from each meter roller 60 into each collection container of each sensor assembly 82 (e.g., via a sensor) and communicate a signal indicative of each weight to the controller 80 (block 110). As previously described, the determination of the weight of product in each collection container may be automated or may include manual steps carried out by an operator. It should be noted that, as described above, the sensor may be a load cell (configured to weigh the product), a light sensor (configured to measure a height of the product stacked in the collection container), or an ultrasonic sensor (configured to measure a height of the product stacked in the collection container), or some other sensor configured to output a signal indicative of an amount and/or weight of product in the collection container (or mass flow sensor, as previously described).

Next, the controller 80 compares the two inputs described above (e.g., the weight of product collected and the number of turns of the meter) for each meter roller 60, and determines (e.g., calculates), based on the two inputs for each meter roller 60, independent calibration rates (e.g., weight per turn or product mass flow per turn) of each meter roller 60 over the period of time (block 112). Further still, the controller 80 utilizes the calibration rates to independently adjust turn rates of each of the motors 62 and, thus, the corresponding meter rollers 60 to achieve target metering rates for each meter roller 60 (block 114).

By providing the above described calibration system and procedure, meter rollers of a metering system may be independently calibrated to ensure that each meter roller is metering an appropriate amount of product to each primary line and, thus, secondary lines coupled to each primary line (e.g., via a header). Accordingly, if one meter is dispensing less product than another meter (e.g., even if both meters are being turned via respective motors at the same rate), the calibration system is capable of independently adjusting (e.g., calibrating) a turn rate and, thus, a metering rate of one or both of the meter rollers. As previously described, all the meter rollers can be calibrated over the same period of time, different meter rollers can be calibrated over different periods of time, or one meter roller can be metered in isolation.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An agricultural product distribution system, comprising:
   a first product meter configured to meter a first amount of agricultural product from a product tank over a first period of time;
   a second product meter configured to meter a second amount of agricultural product from the product tank over a second period of time;
   a first motor coupled to the first product meter and configured to turn the first product meter a first number of turns over the first period of time to meter the first amount of agricultural product;
   a second motor coupled to the second product meter and configured to turn the second product meter a second number of turns over the second period of time to meter the second amount of agricultural product; and
   a controller configured to receive a first input indicative of the first amount of agricultural product and a second input indicative of the first number of turns and to compare the first and second inputs to determine a first calibration rate of the first product meter, and to receive a third input indicative of the second amount of agricultural product and a fourth input indicative of the second number of turns and to compare the third and fourth inputs to determine a second calibration rate of the second product meter.

2. The agricultural product distribution system of claim 1, wherein the first period of time and the second period of time are substantially simultaneous.

3. The agricultural product distribution system of claim 1, wherein the controller selectively determines the first period of time and the second period of time.

4. The agricultural product distribution system of claim 3, wherein the controller comprises user input features configured to enable an operator to selectively determine the first period of time and the second period of time.

5. The agricultural product distribution system of claim 1, wherein the controller is configured to independently adjust, based on the first calibration rate, the second calibration rate, or both, first and second turn rates of the first and second motors, respectively.

6. The agricultural product distribution system of claim 5, wherein the controller is configured to independently adjust the first and second turn rates of the first and second motors, respectively, based on an average of the first and second calibration rates.

7. The agricultural product distribution system of claim 1, comprising one or more sensors configured to detect the first amount of agricultural product and the second amount of agricultural product.

8. The agricultural product distribution system of claim 7, wherein the one or more sensors comprise a load cell configured to output signals indicative of a first weight of the first amount of agricultural product and a second weight of the second amount of agricultural product, wherein the first and third inputs comprise the signals indicative of the first and second weights.

9. The agricultural product distribution system of claim 7, wherein the one or more sensors are communicatively coupled to the controller and are configured to provide the first and third inputs.

10. The agricultural product distribution system of claim 1, wherein the controller comprises one or more user input features configured to enable an operator to manually enter one or more of the first, second, third, or fourth inputs.

11. The agricultural product distribution system of claim 1, comprising a first collection container configured to collect the first amount of agricultural product and a second collection container configured to collect the second amount of agricultural product.

12. The agricultural product distribution system of claim 1, comprising:
- a first row unit configured to receive an agricultural product for distribution from the product tank by way of the first product meter; and
- a second row unit configured to receive the agricultural product for distribution from the product tank by way of the second product meter, wherein the second row unit is separate from the first row unit, and wherein the first row unit and the second row unit are configured to distribute the agricultural product to a field.

13. The agricultural product distribution system of claim 12, comprising:
- a first plurality of row units having the first row unit;
- a second plurality of row units having the second row unit;
- a first header disposed between the first product meter and the first plurality of row units, wherein the first header is configured to receive the agricultural product and distribute the agricultural product to the first plurality of row units; and
- a second header disposed between the second product meter and the second plurality of row units, wherein the second header is configured to receive the agricultural product and distribute the agricultural product to the second plurality of row units.

14. The agricultural product distribution system of claim 1, wherein the first amount of agriculture product and the second amount of agricultural product comprises a solid agricultural product.

15. The agricultural product distribution system of claim 1, wherein the first product meter is a first meter roller, and wherein the second product meter is a second meter roller.

* * * * *